Dec. 23, 1930.  W. A. PITT  1,786,401
TRAIN LIGHTING APPARATUS
Filed March 6, 1929   2 Sheets-Sheet 1

INVENTOR
WILLIAM ALEXANDER PITT.
By
ATTORNEY.

Dec. 23, 1930.  W. A. PITT  1,786,401
TRAIN LIGHTING APPARATUS
Filed March 6, 1929   2 Sheets-Sheet 2
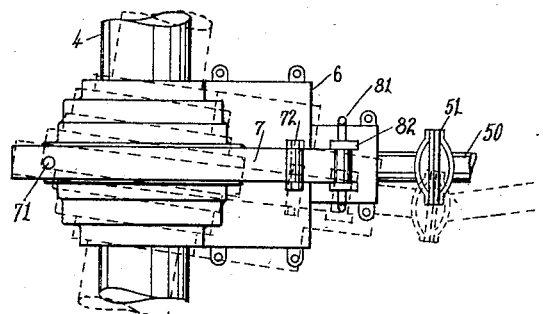
Fig 2
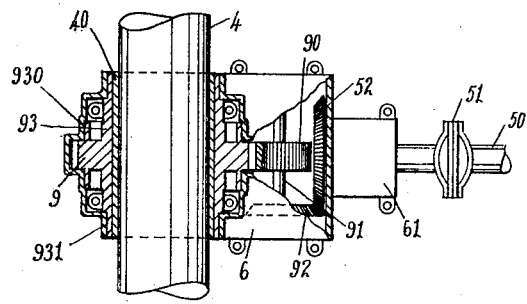
Fig 3
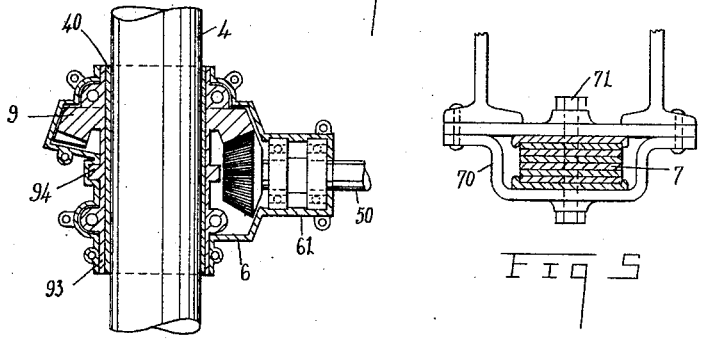
Fig 4
Fig 5
INVENTOR.
WILLIAM ALEXANDER PITT.
By
ATTORNEY Patented Dec. 23, 1930

1,786,401

UNITED STATES PATENT OFFICE

WILLIAM ALEXANDER PITT, OF MONTREAL, QUEBEC, CANADA, ASSIGNOR OF FORTY-NINE PER CENT TO FRANK SUMMER, OF NEW YORK, N. Y.

TRAIN-LIGHTING APPARATUS

Application filed March 6, 1929. Serial No. 344,875.

This invention relates to apparatus for train lighting and particularly to the type in which a generator is mounted beneath the car body and is driven through suitable gear mechanism by one of the truck axles.

The object of my invention is to provide an improved form of transmission mechanism, and of the suspension to the car body of such mechanism.

A further object is to provide a means of mounting the driving gear on the truck axle to ensure its true axial position.

A further object is to provide improved bearings on the driving gear for the transmission casing.

Further objects will be set forth hereinafter.

The invention consists in the construction and arrangement of the various parts according to the description following, as illustrated by the drawings and as covered by the claims.

Reference is made to the accompanying drawings in which:—

Fig. 2 is a plan view showing in dotted lines change of position due to axle movement.

Fig. 3 is a top view of gear mechanism with the casing removed.

Fig. 4 is a similar view with bevel gear drive.

Fig. 5 is a vertical section on the line 5—5 of Fig. 1.

Fig. 6 is a view of the suspension spring.

Figure 1:
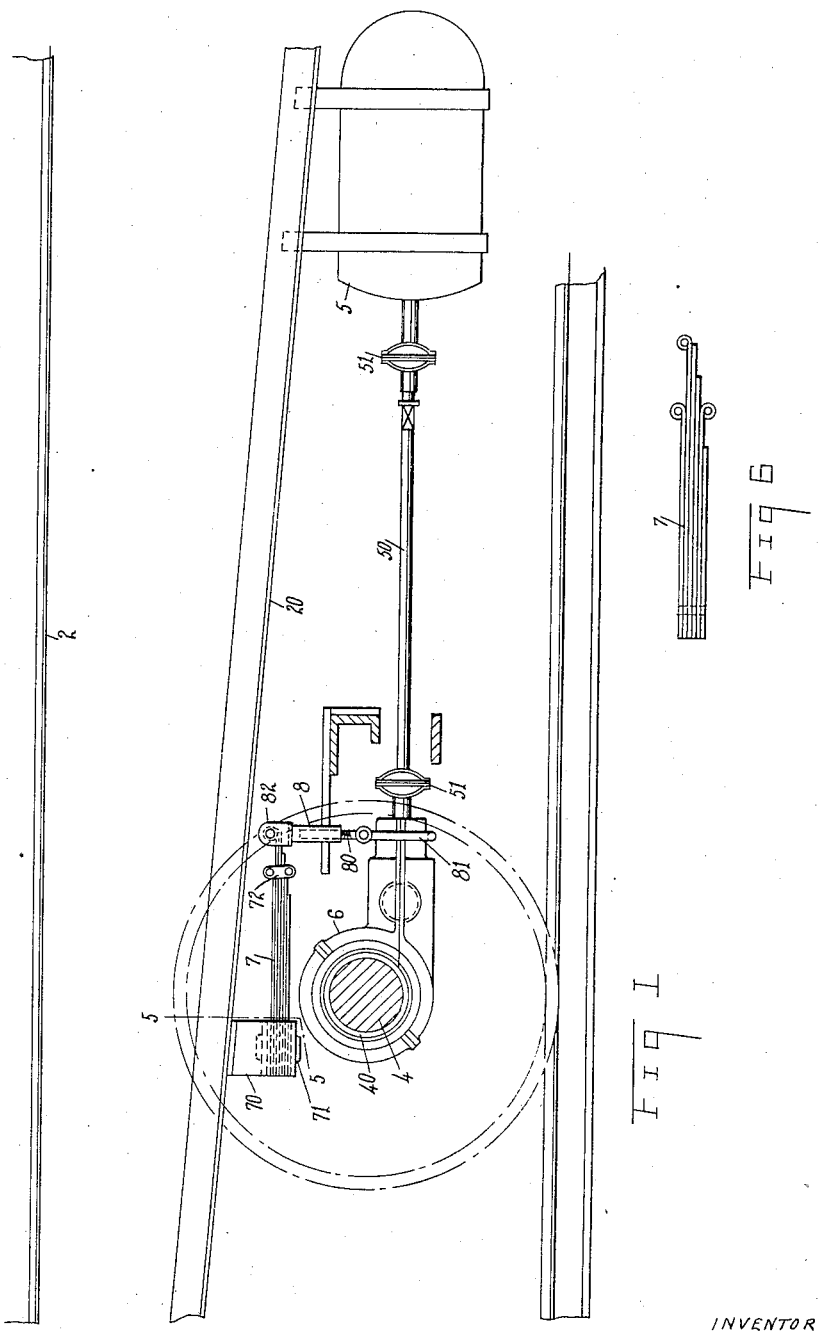
Fig. 1 is a side view of the device showing its suspension and connection to a lighting generator.

In Fig. 1 the under frame 20 of the car body 2 has a U shaped bracket 70 secured to its under side. The bracket 70 has a central vertical pivoting pin 71 which pivots the end of a cantilever spring 7 within the bracket 70. The sides of the bracket 70 are clear of the spring 7 in order to allow for horizontal pivoting of the spring 7.

The truck axle 4 is provided with a cast Babbitt bearing surface 40 forming a sleeve about its center portion, the surface of which is cast true to the axis of rotation of the axle 4, the axle 4 in most cases being rough turned and not true.

The split transmission gear 9 is provided with a broad sleeve 93 adapted to be clamped about the Babbitt sleeve 40 ensuring that the gear 9 will rotate true to the axis of rotation of the axle 4. The sleeve 93 has two outer bearing surfaces 930 and 931 on either side of the gear 9. The transmission casing 6 has corresponding bearing surfaces, which when the casing is secured about the gear 9 and sleeve 93 ensures a steady, true running transmission. In Figure 4 a variation of the gear and casing is shown. The gear 9 is a direct bevel drive to the shaft 50 and the sleeve 93 is provided with a ridge 94 to which the casing 6 conforms to take up end thrust.

The forward end 60 of the transmission casing carries the shaft 91 on which is mounted the pinion 90 and the bevel gear 92. The generator drive shaft 50 has its end mounted in bearings in the extension portion 61 of the transmission casing and has the bevel gear 52 meshing with the bevel gear 92. The generator drive shaft 50 is provided with two flexible couplings 51 between the transmission and the generator 5 which is suspended from the under frame 20.

The spring 7 has its top leaf and the leaf second from the bottom connected through eyelets at their ends by a link 72 which gives a degree of rigidity to that portion of the spring between the link 72 and its seat in the bracket 70 thereby providing a bracket effect. A screw sleeve 8 has a forked upper end 82 which is connected to the spring 7 by a bolt passing through the eye at its flexible end. A screw eye bolt 80 extends downwards from the sleeve 8 and connects with the bolt of the shackle 81 in which is suspended the extension portion 61 of the transmission casing 6. The screw sleeve 8 and eye bolt 80 provide for the adjustment of the casing 6 and drive shaft 50 with the spring 7.

It will be seen from the foregoing that a simple and efficient train lighting apparatus is provided in which the defects of prior apparatus is overcome due to the mounting of the transmission gear on a sleeve of babbitt which has been cast on the axle true to the axis of rotation. The broad sleeve of the gear providing extended bearing surfaces for the transmission casing, ensuring a steady drive to the generator free from vibration and excessive wear.

The simple suspension means provides for the degree of flexibility required for this type of apparatus and takes up any torsional stress due to variation of angle of the transmission with the car body. The pivoting of the spring on its seat allows the end of the spring to approximately swing on the same arc as the transmission casing at its connection with the end of the spring, when the car truck is rounding corners.

What I claim is:

1. In a train lighting apparatus the combination of a generator mounted on the car body, a transmission gear drive for rotatively connecting the car axle to the generator, and suspension means for the drive comprising a leaf spring pivotally mounted on a bracket on the car body and connected at its flexible end with the drive.

2. In a train lighting apparatus, the combination of a generator mounted on the car body, a transmission gear drive for rotatively connecting the car axle to the generator, and suspension means for the drive comprising a bracket arm in the form of a leaf spring pivotally mounted on a bracket on the car body and connected at its flexible end with the drive.

3. In a train lighting apparatus, the combination of a generator mounted on the car body, a transmission gear drive for rotatively connecting the car axle to the generator, and suspension means for the drive comprising a bracket arm in the form of a leaf spring pivotally mounted on a bracket on the car body and adjustably connected at its flexible end with the drive.

4. In a train lighting apparatus, the combination of a generator mounted on the car body, a transmission gear drive mounted on an axially trued Babbitt sleeve on the car axle for rotatively connecting the car axle to the generator, and suspension means for the drive comprising a leaf spring pivotally mounted on a bracket on the car body and connected at its flexible end with the drive.

5. In a train lighting apparatus, a generator drive suspension means comprising a bracket arm in the form of a cantilever spring pivoted to the car body, having its major portion held rigid, and an adjustable connection between its flexible end and the drive.

WILLIAM ALEXANDER PITT.